US005404853A

United States Patent [19]

Ishigami et al.

[11] Patent Number: 5,404,853

[45] Date of Patent: Apr. 11, 1995

[54] ENGINE IGNITION SYSTEM

[75] Inventors: Hidetoshi Ishigami, Iwata; Hitoshi Motose, Hamamatsu, both of Japan

[73] Assignee: Yamaha Hatsudoki Kabushiki Kaisha, Iwata, Japan

[21] Appl. No.: 166,684

[22] Filed: Dec. 14, 1993

[30] Foreign Application Priority Data

Dec. 14, 1992 [JP] Japan .................................. 4-352793

[51] Int. Cl.$^6$ .......................... F02P 5/15; G05B 15/02

[52] U.S. Cl. .................................. 123/417; 364/431.1

[58] Field of Search ............... 123/416, 417, 424, 491, 123/630; 364/431.1

[56] References Cited

U.S. PATENT DOCUMENTS

| | | | |
|---|---|---|---|
| 4,282,574 | 8/1991 | Yoshida et al. | 364/431.10 |
| 4,310,888 | 1/1982 | Furuhashi et al. | 364/431.10 |
| 4,442,812 | 4/1984 | Mizuno et al. | 123/417 |
| 4,558,673 | 12/1985 | Mackie | 123/416 |
| 5,088,464 | 2/1992 | Meaney | 123/417 X |
| 5,277,161 | 1/1994 | Endou | 123/417 |
| 5,301,650 | 4/1994 | Neumayer et al. | 123/630 X |

*Primary Examiner*—Willis R. Wolfe

*Attorney, Agent, or Firm*—Knobbe, Martens, Olson & Bear

[57] ABSTRACT

Two embodiments of an engine control unit prevent engine misfiring when the ignition switch is closed.

10 Claims, 4 Drawing Sheets

ENGINE IGNITION SYSTEM

BACKGROUND OF THE INVENTION

This invention relates to an engine ignition system and more particularly to an engine control unit (ECU) with improved ignition control for an internal combustion engine.

A particularly popular type of engine ignition circuit employs an electronic control for controlling the firing of the spark plugs so as to ensure that they are fired at the appropriate time for the engine running conditions. The control circuit is powered by a constant voltage source which is normally at a lower voltage than that supplied to the primary side of the ignition circuit. Although these type of ignition circuits are very efficient and effective, certain types of them do have one feature which may be undesirable. That is, when the ignition switch is initially turned on, because of the way in which the ignition circuit is triggered, all of the spark plugs will be fired instantly and regardless of the condition of the engine.

Referring to FIG. 1, a conventional engine control unit is identified generally by the reference numeral 11. The engine control unit controls the timing of the ignition circuit 12. The engine control unit is equipped with a microcomputer 13 which is powered by a controlled constant voltage (+5 v) from the +12 v battery 14 at the time the ignition switch 15 is closed. The ignition timing signal cable 17 conducts the ignition control signal from the microcomputer 13 to the base of NPN switching transistor 16. The NPN switching transistor 16 functions as a switch. In the normal state the microcomputer generates a high level signal such that NPN switching transistor 16 functions as a closed switch. The collector of NPN switching transistor 16 is grounded and the input to the ignition circuit 12 is a low level signal such that no power is available to ignite the ignition circuit. In the ignition state the microcomputer 13 generates a low level signal such that NPN switching transistor 16 acts as an open switch and the power from the battery is connected to the ignition circuit 12 causing the engine to fire.

However the conventional engine control unit can cause engine misfiring. As soon as the ignition switch 15 is closed the microcomputer 13 is powered and begins initialization. The initialization causes a delay before the microcomputer 13 can generate the high level signal to the base of NPN switching transistor 16 over the ignition timing signal cable 17. During the delay a low level signal is present on the base of the NPN switching transistor 16 causing the NPN switching transistor 16 to act as a open switch. The battery power is connected to the ignition circuit for each ignition circuit in the engine. As a result all engine cylinders fire at the same time such that an engine misfire occurs before the engine is started.

It is, therefore, an object of this invention is to provide an improved engine control unit for an internal combustion engine.

It is a further object of this invention to provide an engine control unit with a delay circuit active at ignition switch closure wherein the connection between the battery power and the ignition circuit is delayed and wherein the delay is of sufficient time such that the microcomputer is able to generate the ignition control signal.

SUMMARY OF THE INVENTION

This invention is adapted to be embodied in an electronic ignition system for a spark ignited internal combustion engine which is comprised of a spark plug and an ignition circuit for firing the spark plug. The ignition circuit is triggered by a control circuit for firing the spark plug at a specific time interval as determined by the control circuit. The control circuit includes a computer receiving input signals from the engine to determine the correct time of firing of the spark plug from engine running conditions and a switch device switched by said computer for controlling the condition of said ignition circuit. An electrical power supply is provided which supplies electrical power to the ignition circuit and to the control circuit and includes a main switch operable between an open nonconducting condition and a closed conducting condition. Means are provided for delaying the supply of electrical power to the ignition circuit for a time period after the main switch is closed for preventing misfiring of the spark plug upon closure of the main switch.

BRIEF DESCRIPTION OF THE DRAWINGS

In the figures identical or functionally similar elements are shown by like reference numbers.

DETAILED DESCRIPTION OF THE PREFERRED EMBODIMENTS OF THE INVENTION

Figure 1:
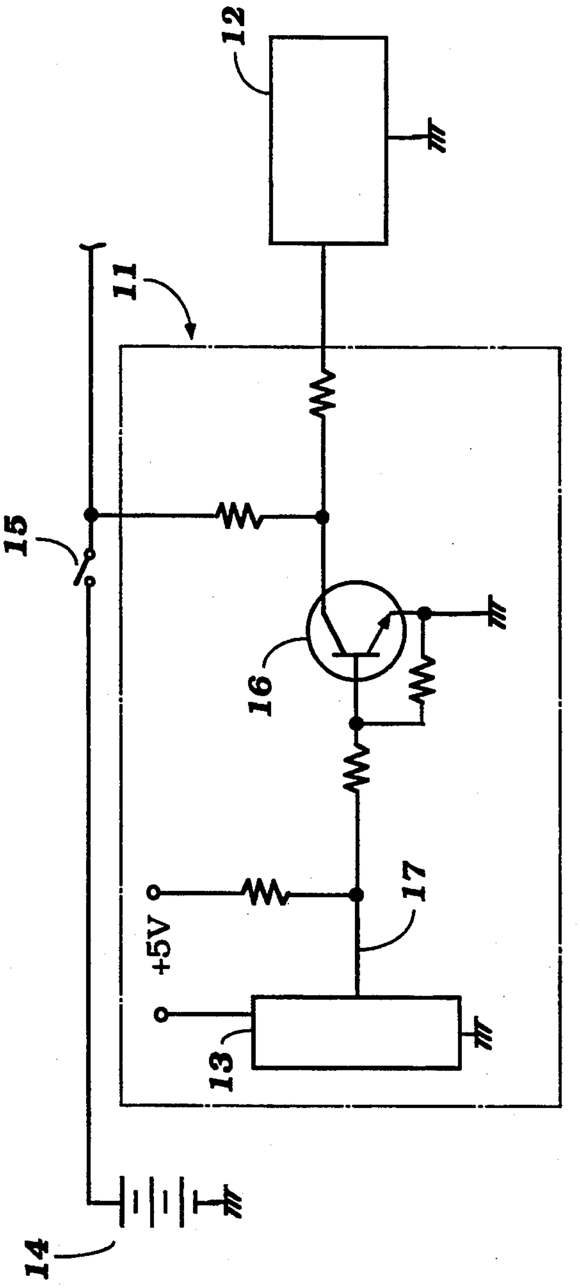
FIG. 1 is a schematic representation of conventional engine control unit.
Figure 2:
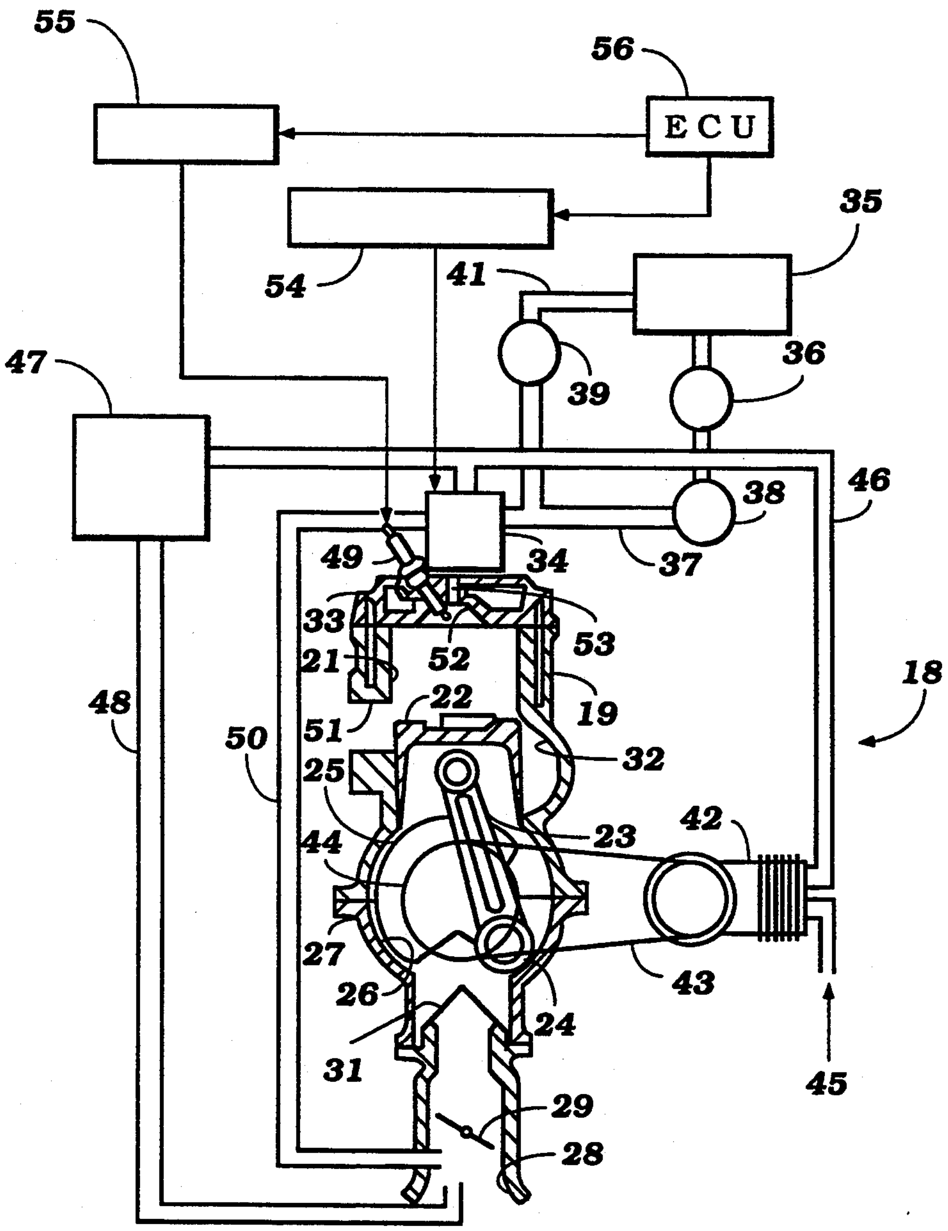
FIG. 2 is a partially schematic cross sectional view taken along through a single cylinder of a multi-cylinder internal combustion engine having an ignition circuit embodying the invention.

Referring to FIG. 2, a single cylinder of a three cylinder two-cycle crankcase compression internal combustion engine is identified generally by the reference numeral 18. Only a single cylinder of the engine 18 is depicted because it is believed that those skilled in the art can readily understand how the invention can be employed with multiple cylinder engines. However, the invention does have particular utility in conjunction with two-cycle engines.

The engine includes a cylinder block 19 formed with a cylinder bore 21 in which a piston 22 reciprocates. The piston 22 is connected by means of a connecting rod 23 to a throw 24 of a crankshaft, indicated at 25, for driving the crankshaft in a known manner.

The crankshaft 25 is rotatably journalled within a crankcase chamber 26 that is formed by the cylinder block 19 and a crankcase 27 that is affixed to the cylinder block in any suitable manner. An air charge is delivered to the crankcase chamber 26 through an intake manifold 28 in which a flow controlling throttle valve 29 is positioned. A reed type check valve 31 is interposed between the intake manifold 28 and the crankcase chamber 26 so as to preclude reverse flow, as is well known in the art. The charge which has been admitted to the crankcase chamber 26 will be compressed during the downward movement of the piston 22 and then is transferred to the combustion chamber through one or more scavenge ports 32.

This combustion chamber is formed by the piston 22 cylinder bore and a cylinder head 33 that is affixed to the cylinder block 19 and supports a fuel/air injector unit 34 of any known type.

Fuel is supplied to the fuel/air injector unit 34 from a remotely positioned fuel tank 35 by means of a fuel pump 36 and conduit 37. A fuel filter 38 is provided in conduit 37 and filters the fuel delivered to the fuel/air injector unit 34. A pressure relief valve 39 is positioned in a return conduit 41 that leads back to the fuel tank 35 and which maintains a uniform head of fuel in the fuel/air injector unit 34 by bypassing excess fuel back to the tank 35.

Compressed air is delivered to the fuel/air injector unit 34 from an air compressor 42. The air compressor 42 is driven by means of a belt 43 from a pulley 44 that is affixed to the crankshaft 25 for rotation with it. The compressor 42 draws air from the atmosphere from an inlet 45 and delivers it to the fuel/air injector unit 34 by means of a supply conduit 46. The air pressure is regulated by a pressure regulator and accumulator 47 which regulates the air pressure by returning excess air to the induction manifold 28 through a bypass conduit 48. A valve, not shown in the fuel/air injector 34 relieves the injector pressure when the injector is not charged by returning excess air to the induction manifold 28 through a bypass conduit 50. The fuel/air injector 34 injects fuel into a combustion chamber 52 formed in part by a recess in the cylinder head 33.

A spark plug 49 fired in a manner to be described is provided in the cylinder head 33 for firing the fuel/air charge generated both by the injector unit 34 and the induction system already described. The burnt fuel/air charge is then discharged to the atmosphere through an exhaust port 51.

The fuel/air injector 34 is controlled by the injection actuating circuit 54 and the spark plug 49 is fired by an ignition circuit 55. An engine control unit 56 provides the timing signals to both the injection actuating circuit 54 and the ignition circuit 55.

Figure 3:
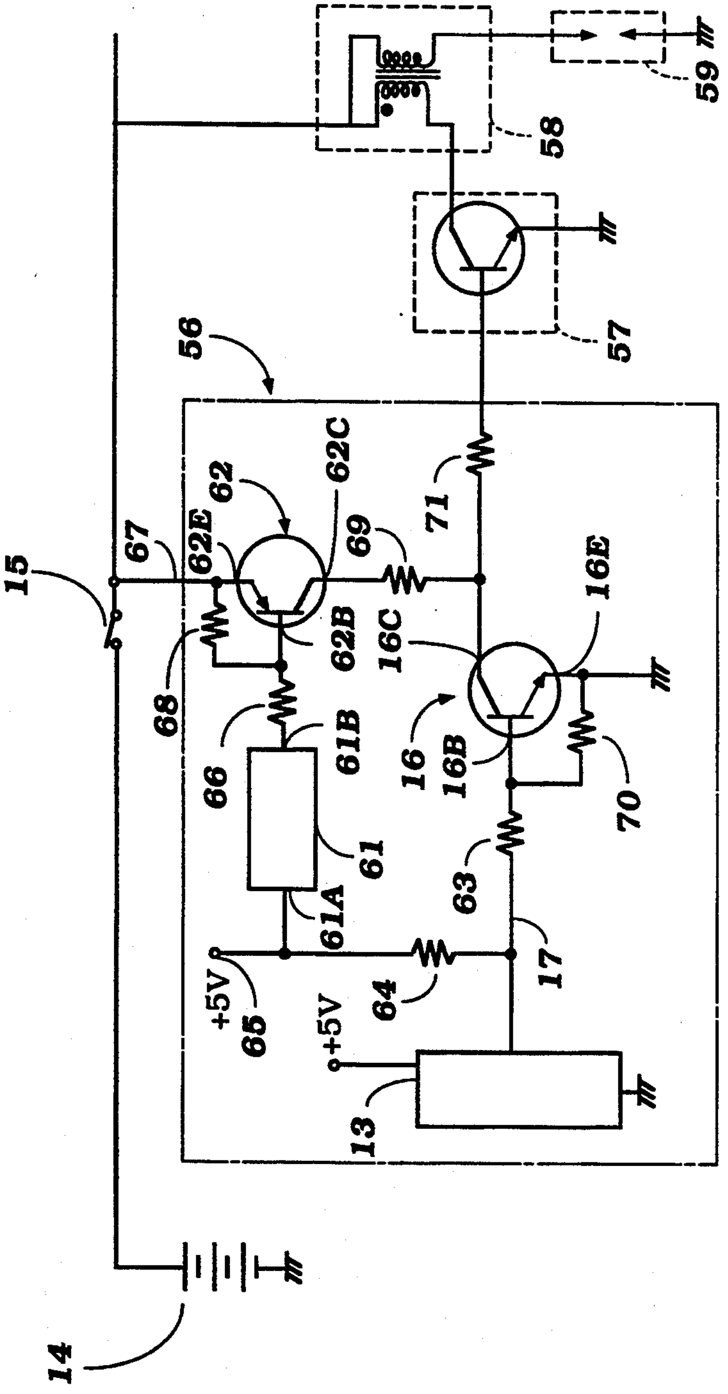
FIG. 3 is a schematic representation of an engine control unit constructed in accordance with embodiments of the invention.

The construction of one type of improved engine control unit is shown in FIG. 3 and will now be described with reference to that figure. FIG. 3 also shows basic components used in conventional engine ignition circuits some of which have already been described by reference to FIG. 2 such as the +12 v battery 14, the ignition switch 15 and the ignition circuit comprising the power transistor 57, the spark coil 58 and the spark plug 59. The improved engine control unit 56 embodies a delay circuit 61 and a PNP transistor switch 62 to keep the ignition circuit from powering during the microcomputer initialization and prevents the engine from misfiring.

The engine control unit 56 comprises a microcomputer 13 which receives signals from engine condition sensors and ambient sensors for any known type of control strategy, a delay circuit 61, an NPN switching transistor 16 and a PNP switching transistor 62. The microcomputer 13 is connected by the ignition timing cable 17 to the base 16B of the NPN switching transistor 16 through in-line limit resistor 63. The emitter 16E is connected to the junction of limit resistor 63 and the base 16B of NPN switching transistor 16 through feedback resistor 70. The junction of the emitter 16E and the feedback resistor 70 is grounded. The junction of the limit resistor 63 and the microcomputer 13 is connected through a pull-up resistor 64 to a power supply 65.

The power supply 65 is connected to the delay circuit input 61A. The delay circuit output 61B is connected to the base 62B of the PNP switching transistor 62 through the in-line limit resistor 66. The emitter 62E of the PNP switching transistor 62 is connected to the movable contact of the ignition switch 15 such that the battery power flows to the emitter 62E through the ignition power cable 67 only when the ignition switch 15 is closed. The emitter 2E of the PNP switching transistor 62 is also connected to the junction of the base 62B of the PNP switching transistor 62 and the limit resistor 66 through the feedback resistor 68. The collector 62C of the PNP switching transistor 62 is connected to the collector 16C of the NPN switching transistor 16 through the in-line limit resistor 69. The junction of collector 16C of the NPN switching transistor 16 and the in-line limit resistor 69 is connected to the output resistor 71.

The other node of the output resistor 71 is connected to the base of power transistor 57 in the ignition circuit. The collector of power transistor 57 is connected to the primary winding of the spark coil 58 and the emitter of power transistor 57 is grounded. One end of the primary winding of spark coil 58 is connected to the junction of the moveable contact of the ignition switch 15, the feedback resistor 68 and the emitter 62E of PNP switching transistor 62. The secondary winding of the spark coil 58 is connected to the terminal of the spark plug 59. The end across the sparking gap of the spark plug 59 is grounded. The negative side of the battery 14 is grounded and the positive side of the battery 14 is connected to the fixed contact of ignition switch 15.

As in the conventional engine control unit 11, the improved embodiment of the engine control unit 56 is equipped with a microcomputer 13 that is powered from a transformed voltage (+5 v) from the battery 14 at the time the ignition switch 15 is closed. While the microcomputer 13 is initializing, the control signal generated on the ignition timing signal cable 17 is a low level signal causing the NPN switching transistor 16 is function as an open switch. However, instead of the battery power being connected to the ignition circuit and causing an engine misfire as in the conventional engine control unit 11, the delay circuit output 61B is a high level signal causing the PNP switching transistor 62 to function as an open switch and the battery power is not connected to the output of the engine control unit 56. It is the high level signal output from the delay circuit 61 to the base 62B of PNP switching transistor 62 that causes the PNP switching transistor 62 to function as an open switch. Thus the result is no battery power sent to the power transistor 57 regardless of the signal level on the ignition timing signal cable 17.

The timing delay provided in the delay circuit 61 is such that the microcomputer initialization is complete before the delay circuit output 61B changes from a high level signal to a low level signal. Once the delay circuit output is a low level signal the base 62B of PNP switching transistor is also low causing the transistor to function as a closed switch such that the battery power is transmitted through emitter 62E to collector 62C of the PNP switching transistor 62. After initialization is complete, the microcomputer 13 actively generates the signal on the ignition timing signal cable 17. In the normal, non-ignition condition, the microcomputer generates a high level signal on the ignition timing signal cable 17 to the base 16B of NPN switching transistor 16. Thus the NPN switching transistor 16 functions as a closed switch. The ground on the emitter 16E is connected to the collector 16C and a low level signal is sent to the base of the power transformer 57 causing the power transistor 57 to act as an open switch. The spark coil 58 has no ground on the power transistor side of the windings such that the circuit is open and no voltage is produced to cause the spark plug 59 to fire.

For an ignition condition, after the microcomputer initialization is complete, the microcomputer 13 generates a low level signal on the ignition timing signal cable 17 to the base 16B of NPN switching transistor 16, causing the NPN switching transistor to function as an open switch. As described above the delay circuit output 61B is a low level signal causing the battery power to be transmitted through the emitter 62E to the collector 62C of PNP switching transistor 62. While NPN switching transistor 16 is functioning as an open switch, the output of the engine control unit 56 to the base of the power transistor 57 is a high level signal causing the power transistor 57 to function as a closed switch. The grounded emitter of the power transistor 57 provides the ground for the windings near the power transistor 57 of the spark coil 58, completing the circuit. The spark coil 58 can then generate the correct voltage and current to cause the spark plug to fire.

Figure 4:
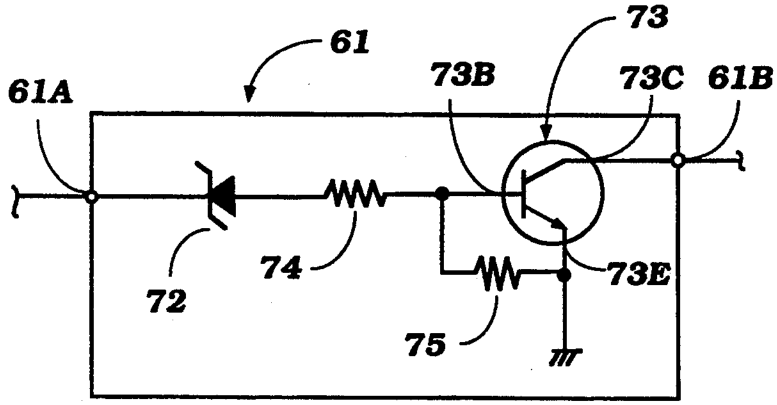
FIG. 4 is a schematic of an embodiment of the delay circuit of the invention.

Many embodiments of delay circuits can provide the delay function in FIG. 3. In a preferred embodiment of the delay circuit, as shown in FIG. 4, the cathode of zener diode 72 is connected to the input of the delay circuit 61A and the power supply 65, not shown. The anode of zener diode 72 is connected to the base 73B of NPN switching transistor 73 through limit resistor 74. The emitter 73E is also connected to the base 73B of NPN switching transistor 73 through feedback resistor 75. The junction of emitter 73E and the feedback resistor 75 is grounded. The collector 73C of the NPN switching transistor 73 is connected to the output of the delay circuit 61B and the limit resistor 66, not shown.

When the ignition switch 15 is closed and the microcomputer 13 initializes, power supply 65 slowly increases its voltage until its predetermined value is reached. While the power supply 65 is ramping up, zener diode 72 does not conduct until the reference voltage of the zener diode 72 is reached by power supply 65. The zener diode 72 and the power supply 65 are chosen such that the zener diode becomes conductive after the microcomputer completes its initialization sequence. While the zener diode 72 is non-conducting the base 73B of NPN switching transistor 73 is low causing the NPN switching transistor 73 to function as an open switch resulting in the delay circuit output 61B to be a high level signal. As discussed above the ignition circuit can not fire.

When the reference voltage of the zener diode 72 is reached by power supply 65 the zener diode 72 conducts a high level signal to the base 73B of NPN switching transistor 73 causing the NPN switching transistor 73 to function as a closed switch. This results in the delay circuit output 61B to be a low level signal. As discussed above the ignition circuit action is controlled by the signal level on the ignition timing signal cable 17 as generated by the microcomputer 13.

Figure 5:
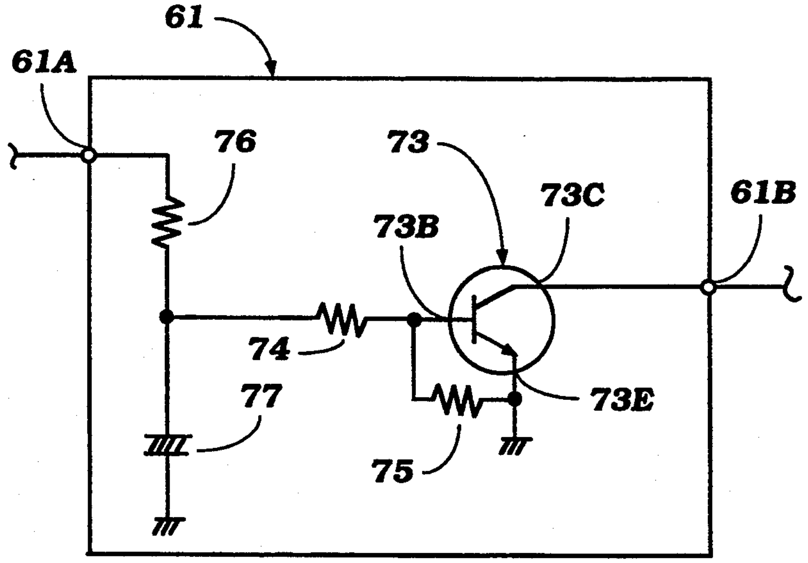
FIG. 5 is a schematic of another embodiment of the delay circuit of the invention.

In another embodiment of delay circuit, shown in FIG. 5, the zener diode of FIG. 4 is replaced by an RC network. Resistor 76 is connected to the delay circuit input 61A and to the power supply 65, not shown. The other node of resistor 76 is connected to capacitor 77 and the base 73B of NPN switching transistor 73 through the in-line limit resistor 74. The other node of capacitor 77 is grounded. The emitter 73E of NPN switching transistor 73 is connected to the base 73B of NPN switching transistor 73 through feedback resistor 75. The junction of emitter 73E of switching transistor 73 and feedback resistor 75 is grounded. The collector 73C of NPN switching transistor 73 is connected to the delay circuit output 61B and the limit resistor 66, not shown.

When the ignition switch 15 is closed and the microcomputer 13 is initializing, power supply 65 slowly increases its voltage until its predetermined value is reached. While power supply 65 is ramping up capacitor 77 is charging at a rate determined by the values of resistor 76 and capacitor 77. The values of resistor 76 and capacitor 77 are chosen such that the time it takes for capacitor 77 to fully charge is greater than the time needed to initialize the microcomputer 13. While capacitor 77 is charging the base 73B of NPN switching transistor 73 is low causing NPN switching transistor 73 to function as an open switch. Referring to FIG. 3, this results in a high level signal from the battery power present on the base 62B of PNP switching transistor 62 and therefore the delay circuit output 61B is also a high level signal. As discussed above the ignition circuit can not fire.

When capacitor 77 is fully charged the base 73B of NPN switching transistor 73 is high causing the NPN switching transistor 73 to function as a closed switch resulting in the delay circuit output 61B to be a low level signal. As discussed above the ignition circuit is controlled by the signal level on the ignition timing signal cable 17 as generated by the microcomputer 13.

The values of the limit, output and feedback resistors in the described embodiments are chosen to provide the proper signal levels and current limits required to permit proper functioning of the transistors in the circuit without exceeding the operational limits of these transistors.

Thus the described embodiments of this invention prevent the problem of the conventional engine control unit 11. The delay circuit 61 and additional transistor switch 62 prevent the engine from misfiring before the engine is started. The delay circuit 61 prevents the additional transistor switch 62 from enabling the battery power to the conventional transistor switch 16 while the microcomputer 13 is initializing. After the initialization is complete the delay circuit 61 allows the additional transistor switch 62 to enable the battery power to the conventional transistor switch 16. Thus, only after the initialization delay, the action of the power transistor 57, the spark coil 58 and the spark plug 59 is controlled by the ignition control signal generated by the microcomputer 13 to the conventional transistor switch 16.

From the foregoing descriptions, it should be readily apparent that the described embodiments of the invention are very effective in providing an engine control unit wherein the engine does not misfire before starting. Of course, the foregoing description is that of preferred embodiments of the invention and various changes and modifications may be made without departing from the spirit and scope of the invention, as defined by the appended claims.

We claim:

1. An electronic ignition system for a spark ignited internal combustion engine comprised of a spark plug, an ignition circuit for firing said spark plug, said ignition circuit being triggered by a control circuit for firing said spark plug at specific time intervals as determined by said control circuit, said control circuit including a computer receiving input signals from said engine to determine the correct time of firing of said spark plug for the engine running conditions, and a switch device for controlling the condition of said ignition circuit, an electric power source, means for supplying electrical power from said electric power source to said ignition circuit and to said control circuit including a main switch operable between an open, non-conducting condition and a closed, conducting condition, and means for delaying the supply of electrical power to said ignition circuit for a time period after said main switch is closed for preventing misfiring of said spark plug.

2. An electronic ignition system for a spark ignited internal combustion engine as set forth in claim 1 wherein the means for delaying the supply of electrical power to the ignition circuit comprises a solid state device switchable between a conductive position for supplying power to the ignition circuit and a non-conducting position for preventing the supply of power to the ignition circuit and a time delay circuit for switching said solid state device between its conducting and non-conducting condition.

3. An electronic ignition system for a spark ignited internal combustion engine as set forth in claim 2 wherein the means for switching the solid state device comprises a further solid state device switched by a time delay circuit.

4. An electronic ignition system for a spark ignited internal combustion engine as set forth in claim 3 wherein the time delay circuit includes a capacitor charged by the closure of the main switch.

5. An electronic ignition system for a spark ignited internal combustion engine as set forth in claim 3 wherein the time delay circuit includes a zener diode energized upon closure of the main switch.

6. An electronic ignition system for a spark ignited internal combustion engine as set forth in claim 1 wherein the electric power source comprises a battery and full battery voltage is applied to the ignition circuit and a controlled lower voltage is applied to the control circuit.

7. An electronic ignition system for a spark ignited internal combustion engine as set forth in claim 6 wherein the means for delaying the supply of electrical power to the ignition circuit comprises a solid state device switchable between a conductive position for supplying power to the ignition circuit and a non-conducting position for preventing the supply of power to the ignition circuit and a time delay circuit for switching said solid state device between its conducting and non-conducting condition.

8. An electronic ignition system for a spark ignited internal combustion engine as set forth in claim 7 wherein the means for switching the solid state device comprises a further solid state device switched by a time delay circuit.

9. An electronic ignition system for a spark ignited internal combustion engine as set forth in claim 8 wherein the time delay circuit includes a capacitor charged by the closure of the main switch.

10. An electronic ignition system for a spark ignited internal combustion engine as set forth in claim 9 wherein the time delay circuit includes a zener diode energized upon closure of the main switch.

* * * * *